(No Model.)
T. C. WHITE.
COFFEE ROASTER.
No. 274,538.  Patented Mar. 27, 1883.
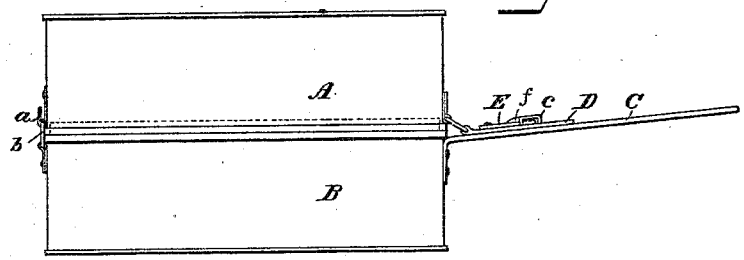
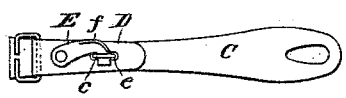
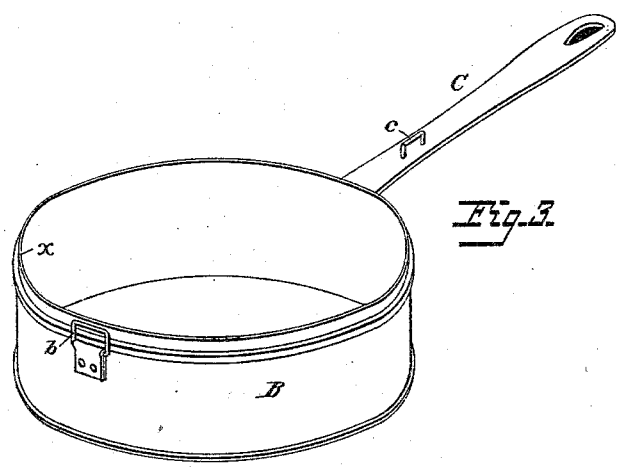
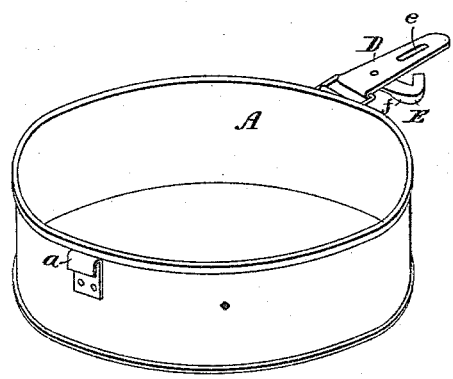
Attest:
Courtney A. Cooper
N. E. Hansmann
Thos. C. White
Inventor:
By Chas. E. Foster
his attorney.

UNITED STATES PATENT OFFICE.

THOMAS C. WHITE, OF CARTERVILLE, ILLINOIS.

COFFEE-ROASTER.

SPECIFICATION forming part of Letters Patent No. 274,538, dated March 27, 1883.

Application filed September 9, 1882. (No model.)

*To all whom it may concern:*

Be it known that I, THOMAS C. WHITE, of Carterville, Williamson county, Illinois, have invented an Improved Coffee-Roaster and Culinary Utensil, of which the following is a specification.

My invention is a combined coffee-roaster and culinary utensil that is cheap and effective as a roaster, and has the several parts or sections adapted to be used independently for culinary purposes.

In the drawings, Figure 1 is a side view of a roaster constructed in accordance with my invention. Fig. 2 is a detail plan view; Figs. 3 and 4, perspective views of parts detached.

A and B represent two receptacles of any suitable form, and adapted be brought together mouth to mouth, so that a flange, $x$, of the receptacle B is received by the receptacle A. The receptacle B is provided with a laterally-projecting handle, C, upon which is a loop or staple $c$. To the receptacle A is hinged a tongue, D, having a slot, $e$, adapted to receive the loop $c$ on the handle C, that the loop may be secured by a hook, E, pivoted on the tongue, the end of the hook being passed through the loop to retain the handle and tongue and hold the receptacles together at one side. The hook E has a lip, $f$, to facilitate its manipulation. Upon the side opposite the handle and tongue the receptacles are connected by a hook, $a$, upon the receptacle A, and a link, $b$, pivoted to the section B. As thus connected the device constitutes a coffee-roaster which may be opened and closed, swinging on the parts $a\ b$, which serve as a temporary hinge.

When the device is not required for roasting, the handle and tongue may be disengaged by withdrawing the hook E from the loop $c$, and the receptacles A B are unhinged, when they may be used separately, as saucepans, stew-pans, &c.

I claim—

The combination of the receptacle B, provided with a link, $b$, and a handle, C, having a loop, $c$, and the receptacle A, provided with a hook, $a$, and pivoted tongue D, having a slot, $e$, and carrying a hook, E, as set forth.

In testimony whereof I have signed my name to this specification in the presence of two subscribing witnesses.

THOMAS C. WHITE.

Witnesses:
W. H. PERRY,
WM. TIPPET.